United States Patent
Middlestead et al.

(10) Patent No.: US 11,018,754 B2
(45) Date of Patent: May 25, 2021

(54) RF COMMUNICATIONS SYSTEM AND METHOD

(71) Applicant: Appareo Systems, LLC, Fargo, ND (US)

(72) Inventors: Greg M. Middlestead, West Fargo, ND (US); Robert M. Allen, Detroit Lakes, MN (US); Nicholas L. Butts, West Fargo, ND (US); Jordan M. Dahl, Escondido, CA (US); Joshua N. Gelinske, Fargo, ND (US); John Michael Zietz, Horace, ND (US)

(73) Assignee: Appareo Systems, LLC, Fargo, ND (US)

( * ) Notice: Subject to any disclaimer, the term of this patent is extended or adjusted under 35 U.S.C. 154(b) by 0 days.

(21) Appl. No.: 16/501,478

(22) Filed: Aug. 7, 2019

(65) Prior Publication Data

US 2020/0322040 A1    Oct. 8, 2020

Related U.S. Application Data

(60) Provisional application No. 62/715,380, filed on Aug. 7, 2018.

(51) Int. Cl.
| | |
|---|---|
| *H04B 1/44* | (2006.01) |
| *H04B 7/185* | (2006.01) |
| *H04B 1/04* | (2006.01) |
| *G10L 15/26* | (2006.01) |
| *G01S 19/15* | (2010.01) |
| *B64D 11/00* | (2006.01) |
| *H04B 1/00* | (2006.01) |
| *B64D 43/00* | (2006.01) |

(52) U.S. Cl.
CPC ..... *H04B 7/18506* (2013.01); *B64D 11/0015* (2013.01); *G01S 19/15* (2013.01); *G10L 15/26* (2013.01); *H04B 1/0057* (2013.01); *H04B 1/04* (2013.01); *H04B 1/44* (2013.01); *B64D 43/00* (2013.01)

(58) Field of Classification Search
CPC .... H04B 7/18506; H04B 1/0057; H04B 1/04; H04B 1/44; B64D 11/0015; B64D 43/00; G01S 19/15; G10L 15/26
USPC ......................................... 455/90.1; 704/232
See application file for complete search history.

(56) References Cited

U.S. PATENT DOCUMENTS 6,069,539 A * 5/2000 Sanders .............. G06F 13/4086
                                                    333/124
6,167,239 A * 12/2000 Wright .............. H04B 7/18506
                                                    340/945

(Continued)

*Primary Examiner* — Hai V Nguyen
(74) *Attorney, Agent, or Firm* — Hovey Williams LLP

(57) ABSTRACT

An RF communications (COMM) system includes a COMM antenna connected to a signal processing unit including a multi-channel analog navigation/communications (NAV/COMM) transceiver and an analog COMM transmitter. The system is configured for switching between the transceiver and the transmitter, based on preprogrammed parameters including prioritizing signals based on keywords, system location and other parameters. An aircraft application is disclosed. A global navigation satellite subsystem (GNSS) subsystem can be connected to the signal processing unit for locating the telecommunications system. A method includes the steps of providing an RF communications system for aircraft and other applications.

19 Claims, 5 Drawing Sheets

(56) References Cited

U.S. PATENT DOCUMENTS

| | | | | |
|---|---|---|---|---|
| 6,353,846 B1* | 3/2002 | Fleeson | | G06F 9/5011 |
| | | | | 718/104 |
| 6,700,787 B1* | 3/2004 | Beseth | | H05K 7/1412 |
| | | | | 361/728 |
| 6,842,122 B1* | 1/2005 | Langner | | G01C 23/005 |
| | | | | 340/945 |
| 6,999,022 B1* | 2/2006 | Vesel | | G01S 13/933 |
| | | | | 342/30 |
| 7,737,867 B2* | 6/2010 | Arthur | | G08G 5/0021 |
| | | | | 340/980 |
| 7,796,954 B2* | 9/2010 | Whitaker Filho | . | H04B 7/18506 |
| | | | | 455/73 |
| 8,081,933 B2* | 12/2011 | Malaga | | H04B 7/18506 |
| | | | | 455/90.2 |
| 8,254,869 B2* | 8/2012 | Hyde | | H01Q 1/3291 |
| | | | | 455/345 |
| 9,015,773 B2* | 4/2015 | Kim | | H04N 21/4722 |
| | | | | 725/73 |
| 9,060,151 B2* | 6/2015 | Kim | | H04N 7/0885 |
| | | | | 342/30 |
| 9,264,648 B2* | 2/2016 | Kitahara | | H04N 21/4722 |
| 9,264,759 B2* | 2/2016 | Lee | | H04N 21/8133 |
| 9,326,045 B2* | 4/2016 | Lee | | H04N 21/2353 |
| 9,573,698 B1* | 2/2017 | He | | G08G 5/0021 |
| 9,596,510 B2* | 3/2017 | Moon | | H04N 21/462 |
| 9,661,371 B2* | 5/2017 | Moon | | H04N 21/4126 |
| 9,665,645 B2* | 5/2017 | Hawley | | G08G 5/0013 |
| 9,667,902 B2* | 5/2017 | Kim | | H04N 21/8126 |
| 9,704,405 B2* | 7/2017 | Kashi | | G08G 5/0095 |
| 9,712,864 B2* | 7/2017 | Lee | | H04N 21/4622 |
| 9,716,912 B2* | 7/2017 | Lee | | H04N 21/266 |
| 9,723,362 B2* | 8/2017 | Kim | | H04N 21/4331 |
| 9,819,410 B1* | 11/2017 | Azevedo | | H04B 7/18508 |
| 9,838,741 B2* | 12/2017 | Moon | | H04N 21/6125 |
| 9,883,239 B2* | 1/2018 | Lee | | H04N 21/23614 |
| 9,948,990 B2* | 4/2018 | Lee | | H04N 21/482 |
| 9,986,198 B2* | 5/2018 | Kitahara | | H04N 21/8173 |
| 10,102,760 B1* | 10/2018 | Foltan | | G08G 5/0008 |
| 10,211,914 B2* | 2/2019 | Stayton | | H04B 7/18506 |
| 10,370,102 B2* | 8/2019 | Boykin | | H04B 7/18506 |
| 10,516,497 B2* | 12/2019 | Kitazato | | H04N 21/4431 |
| 2003/0229900 A1* | 12/2003 | Reisman | | H04N 21/42204 |
| | | | | 725/87 |
| 2004/0224740 A1* | 11/2004 | Ball | | A63F 13/10 |
| | | | | 463/6 |
| 2005/0114627 A1* | 5/2005 | Budny | | G06F 9/5027 |
| | | | | 712/34 |
| 2005/0156777 A1* | 7/2005 | King | | G08G 5/0021 |
| | | | | 342/29 |
| 2005/0220055 A1* | 10/2005 | Nelson | | H04W 84/02 |
| | | | | 370/331 |
| 2005/0246353 A1* | 11/2005 | Ezer | | G06F 40/18 |
| 2006/0057974 A1* | 3/2006 | Ziarno | | H04B 7/18506 |
| | | | | 455/98 |
| 2006/0176651 A1* | 8/2006 | Olzak | | F16L 5/04 |
| | | | | 361/679.46 |
| 2006/0216674 A1* | 9/2006 | Baranov | | G09B 9/08 |
| | | | | 434/29 |
| 2006/0227995 A1* | 10/2006 | Spatharis | | G06F 16/58 |
| | | | | 382/100 |
| 2006/0253874 A1* | 11/2006 | Stark | | H04N 21/4126 |
| | | | | 725/62 |
| 2007/0020588 A1* | 1/2007 | Batcheller | | G09B 9/08 |
| | | | | 434/30 |
| 2007/0100516 A1* | 5/2007 | Olzak | | H05K 9/0066 |
| | | | | 701/14 |
| 2007/0142980 A1* | 6/2007 | Ausman | | B64C 19/00 |
| | | | | 701/3 |
| 2007/0241936 A1* | 10/2007 | Arthur | | G02B 27/01 |
| | | | | 340/958 |
| 2008/0254750 A1* | 10/2008 | Whitaker Filho | . | H04B 7/18506 |
| | | | | 455/73 |
| 2008/0261638 A1* | 10/2008 | Wahab | | H03M 1/0639 |
| | | | | 455/500 |
| 2009/0147758 A1* | 6/2009 | Kumar | | H04L 67/1095 |
| | | | | 370/338 |
| 2010/0050217 A1* | 2/2010 | Suh | | H04N 21/235 |
| | | | | 725/87 |
| 2010/0092926 A1* | 4/2010 | Fabling | | G09B 9/08 |
| | | | | 434/30 |
| 2010/0149329 A1* | 6/2010 | Maguire, Jr. | | G06F 3/011 |
| | | | | 348/121 |
| 2010/0231706 A1* | 9/2010 | Maguire, Jr. | | G06F 3/016 |
| | | | | 348/121 |
| 2011/0075990 A1* | 3/2011 | Eyer | | H04N 21/4722 |
| | | | | 386/241 |
| 2011/0125503 A1* | 5/2011 | Dong | | G10L 21/0216 |
| | | | | 704/275 |
| 2011/0160941 A1* | 6/2011 | Garrec | | G01S 13/933 |
| | | | | 701/17 |
| 2011/0246488 A1* | 10/2011 | Eyer | | G06Q 30/0203 |
| | | | | 707/754 |
| 2011/0282522 A1* | 11/2011 | Prus | | G08G 5/0013 |
| | | | | 701/4 |
| 2011/0302611 A1* | 12/2011 | Eyer | | H04N 21/433 |
| | | | | 725/46 |
| 2012/0038501 A1* | 2/2012 | Schulte | | G08G 5/0013 |
| | | | | 342/30 |
| 2012/0054214 A1* | 3/2012 | Yamagishi | | H04N 21/4755 |
| | | | | 707/758 |
| 2012/0054235 A1* | 3/2012 | Kitazato | | H04N 21/6543 |
| | | | | 707/770 |
| 2012/0054267 A1* | 3/2012 | Yamagishi | | H04L 67/42 |
| | | | | 709/203 |
| 2012/0054268 A1* | 3/2012 | Yamagishi | | H04N 21/6582 |
| | | | | 709/203 |
| 2012/0054783 A1* | 3/2012 | Yamagishi | | H04L 67/42 |
| | | | | 725/13 |
| 2012/0054816 A1* | 3/2012 | Dewa | | H04N 21/8166 |
| | | | | 725/116 |
| 2012/0060197 A1* | 3/2012 | Kitahara | | H04N 21/6175 |
| | | | | 725/131 |
| 2012/0082266 A1* | 4/2012 | Kitazato | | H04H 20/106 |
| | | | | 375/316 |
| 2012/0084829 A1* | 4/2012 | Kitazato | | H04N 21/84 |
| | | | | 725/110 |
| 2012/0215505 A1* | 8/2012 | Srivastav | | G08G 5/0017 |
| | | | | 703/6 |
| 2012/0253826 A1* | 10/2012 | Kitazato | | H04N 21/443 |
| | | | | 704/500 |
| 2012/0274848 A1* | 11/2012 | Kitahara | | H04N 21/47214 |
| | | | | 348/473 |
| 2012/0299752 A1* | 11/2012 | Mahmoud | | G08G 5/0082 |
| | | | | 340/972 |
| 2013/0036440 A1* | 2/2013 | Eyer | | H04H 20/59 |
| | | | | 725/40 |
| 2013/0055313 A1* | 2/2013 | Eyer | | H04N 21/6125 |
| | | | | 725/49 |
| 2013/0093612 A1* | 4/2013 | Pschierer | | G01S 13/933 |
| | | | | 342/36 |
| 2013/0103716 A1* | 4/2013 | Yamagishi | | H04N 21/8358 |
| | | | | 707/770 |
| 2013/0121219 A1* | 5/2013 | Stayton | | H04B 7/26 |
| | | | | 370/310 |
| 2013/0133014 A1* | 5/2013 | Kim | | H04N 21/4345 |
| | | | | 725/86 |
| 2013/0137415 A1* | 5/2013 | Takikawa | | H04W 4/50 |
| | | | | 455/418 |
| 2013/0139199 A1* | 5/2013 | Lee | | H04N 21/435 |
| | | | | 725/40 |
| 2013/0171964 A1* | 7/2013 | Bhatia | | H04W 12/08 |
| | | | | 455/411 |
| 2013/0201037 A1* | 8/2013 | Glover | | G08G 5/065 |
| | | | | 340/945 |
| 2013/0254828 A1* | 9/2013 | Reimers | | H04N 21/44209 |
| | | | | 725/134 |
| 2013/0265186 A1* | 10/2013 | Gelli | | G01S 13/781 |
| | | | | 342/32 |
| 2013/0311669 A1* | 11/2013 | Reimers | | H04H 60/41 |
| | | | | 709/231 |

(56) References Cited

U.S. PATENT DOCUMENTS

| | | | |
|---|---|---|---|
| 2014/0024395 A1* | 1/2014 | Johnson | G08G 5/0021 455/456.3 |
| 2014/0099078 A1* | 4/2014 | Kitahara | H04N 21/4622 386/248 |
| 2014/0109128 A1* | 4/2014 | Lee | H04N 21/4622 725/25 |
| 2014/0143811 A1* | 5/2014 | Lee | H04N 21/266 725/47 |
| 2014/0181887 A1* | 6/2014 | Moon | H04N 21/4349 725/133 |
| 2014/0201796 A1* | 7/2014 | Moon | H04N 21/4345 725/110 |
| 2014/0201797 A1* | 7/2014 | Kim | H04N 21/26241 725/116 |
| 2014/0204271 A1* | 7/2014 | Kim | H04N 5/44 348/553 |
| 2014/0303813 A1* | 10/2014 | Ihns | H04L 7/0083 701/3 |
| 2015/0052570 A1* | 2/2015 | Lee | H04N 21/435 725/110 |
| 2015/0083674 A1* | 3/2015 | Sarno | H05K 7/20136 211/26 |
| 2015/0156546 A1* | 6/2015 | Moon | H04N 21/64322 725/110 |
| 2015/0162001 A1* | 6/2015 | Kar | G10L 17/22 704/235 |
| 2015/0302870 A1* | 10/2015 | Burke | G10L 15/10 704/246 |
| 2015/0341796 A1* | 11/2015 | Williams | H04N 21/4524 725/31 |
| 2015/0349875 A1* | 12/2015 | Lauer | H04L 65/1006 370/316 |
| 2015/0350719 A1* | 12/2015 | Kim | H04N 21/8586 725/32 |
| 2015/0364044 A1* | 12/2015 | Kashi | G08G 5/0065 701/120 |
| 2016/0112671 A1* | 4/2016 | Kitahara | H04N 21/8173 386/240 |
| 2016/0134927 A1* | 5/2016 | Kitazato | H04N 21/2381 725/110 |
| 2016/0202950 A1* | 7/2016 | Hawley | G08G 5/0052 700/94 |
| 2016/0227288 A1* | 8/2016 | Lee | H04N 21/482 |
| 2016/0277788 A1* | 9/2016 | Lee | H04N 21/84 |
| 2016/0301439 A1* | 10/2016 | Brinkley | H04B 1/3822 |
| 2016/0347473 A1* | 12/2016 | Khatwa | B64D 45/00 |
| 2016/0379640 A1* | 12/2016 | Joshi | G10L 15/26 704/235 |
| 2017/0013028 A1* | 1/2017 | Yang | H04N 21/235 |
| 2017/0036776 A1* | 2/2017 | He | B64D 43/00 |
| 2017/0069312 A1* | 3/2017 | Sundararajan | G10L 15/02 |
| 2017/0106997 A1* | 4/2017 | Bekanich | H04B 7/18506 |
| 2017/0213552 A1* | 7/2017 | Gupta | G10L 15/22 |
| 2017/0223432 A1* | 8/2017 | Lee | H04N 21/8173 |
| 2017/0299685 A1* | 10/2017 | McCullen | H01Q 1/28 |
| 2017/0374429 A1* | 12/2017 | Yang | H04N 21/8545 |
| 2018/0026733 A1* | 1/2018 | Yang | H04L 65/608 725/33 |
| 2018/0035153 A1* | 2/2018 | Yang | H04N 21/4104 |
| 2018/0044034 A1* | 2/2018 | Newman | H04B 7/1851 |
| 2018/0050800 A1* | 2/2018 | Boykin | H04N 21/435 |
| 2018/0053501 A1* | 2/2018 | Hilal | G06F 40/211 |
| 2018/0131972 A1* | 5/2018 | Yamagishi | H04N 21/44222 |
| 2018/0159644 A1* | 6/2018 | Yang | H04N 21/27 |
| 2018/0302807 A1* | 10/2018 | Chen | H04W 28/0268 |
| 2020/0027457 A1* | 1/2020 | Gelinske | G10L 15/30 |
| 2020/0082645 A1* | 3/2020 | Shaw | B60W 50/045 |

\* cited by examiner

RF COMMUNICATIONS SYSTEM AND METHOD

CROSS-REFERENCE TO RELATED APPLICATIONS

This application claims priority in U.S. Provisional Patent Application No. 62/715,380, filed Aug. 7, 2018, and is related to U.S. patent application Ser. No. 16/514,963, which are incorporated herein by reference.

BACKGROUND OF THE INVENTION

1. Field of the Invention

The present invention relates generally to radio frequency (RF) communications, and in particular to a system and method for processing communications (COMM) and navigation (NAV) signals received by and transmitted from aircraft.

2. Description of the Related Art

Aircraft are currently equipped with various RF communications components, including receivers, transmitters (collectively transceivers), user interface components, such as microphones, audio headsets and loudspeakers. Antennae are commonly mounted on aircraft exteriors to optimize signal transmission and reception. Presently 2,280 frequencies or channels are utilized for aviation. Significant aircrew attention is often devoted to managing communications, with the potential for miscommunications compromising safe, efficient and accurate operations.

In addition to such installed components, aircrew often supplement aircraft-mounted systems with personal, "smart" communications devices. For example, many options are presently available for the smart devices themselves, applications ("apps") downloaded on them and communications service providers. Significant improvements in the field of avionics have been introduced in recent years. For example, navigation or "NAV" is often accomplished with technology using Global Navigation Satellite System (GNSS) resources. The U.S.-based Global Positioning System (GPS) is presently the most widely used, but other regional and national GNSS satellite constellations have been deployed and are in use worldwide.

The objectives of such avionics communications include safety, efficiency and accuracy. Assisting aircrew with prioritizing communications is an important objective. For example, aircraft on final approaches to their destinations typically receive significant amounts of information from air traffic controllers (ATCs) and other aircraft. High-priority communications, particularly in proximity to airports, include emergency communications and weather alerts.

The Federal Aviation Administration (FAA) routinely broadcasts Notices to Airmen (NOTAM), which can include traffic, weather, terminal status and other information important to aircrews. Such notices can include high-priority information of importance in safe and efficient aircraft operations.

Previous avionics communications systems used multiple receivers and transmitters on individual aircraft. A common configuration included a COMM transceiver and a separate NAV/COMM transceiver. Currently, many general avionic panels include a COMM panel mount and a NAV/COMM panel mount. Commonly, pilots would use the second COMM radio to monitor two additional VHF towers. Technology for monitoring multiple channels includes scanners and similar avionics. Another commonly used RF aviation communications procedure involves four-digit "squawk" code assignments to aircraft within relatively close proximity to terminals, e.g., when arriving and departing. Utilizing such air traffic control (ATC) assigned squawk codes significantly narrows the scope of RF communications which the aircrews must monitor. Still further, flight procedures require responding to certain RF transmissions from ATCs and other aircrafts, whereas other transmissions can be received, monitored and saved without immediate aircrew response.

The present invention addresses the RF communications tasks associated with aircraft operations. Embodiments of the present invention address the challenges to both aircrew and ground personnel, which are presented by current RF avionics communications systems and procedures.

Currently, most general avionics panels include a COMM panel mount for a COMM transceiver and a NAV/COMM panel mount for a NAV/COMM transceiver. Aircrew commonly use the second COMM radio to monitor two additional VHF towers. However, an additional (e.g., NAV/COMM) transceiver adds considerable expense to the aircraft avionics system. Combining the COMM and NAV/COMM transceivers with the technology of the present invention saves equipment expense and instrument panel space, as compared to prior art avionics systems. Aircrew workloads and distractions are reduced with the present invention by automating the multi-channel and multi-frequency monitoring and prioritizing procedures. Still further, the present invention accomodates both voice and text communications formats, and enables voice-to-text and text-to-voice signal conversions. Aircrew can thus optimize procedures by listening to voice communications and reading text communications, as appropriate. NAV/COMM procedures can thus be simplified to minimize aircrew workloads and distractions, particularly during relatively intense phases of flights, such as takeoffs, climb-outs, final approaches and landings. Effective coordination with other air traffic is also optimized with the present invention.

The present invention provides a simplified NAV/COMM system by combining a COMM radio and a NAV/COMM radio into a single system, which can simultaneously receive and process multiple COMM channels with a single receiver.

Heretofore there has not been available a system and method for RF communications with the advantages and features of the present invention.

SUMMARY OF THE INVENTION

In the practice of an aspect of the present invention, NAV/COMM and COMM transceivers are combined in a single system, which prioritizes and accommodates communications on multiple channels (frequencies) for optimizing safety, efficiency and accuracy.

According to another aspect of the system, incoming transmissions can be classified, prioritized and communicated to aircrew through appropriate audio and visual interface components. Similarly, aircrew can rank channels (frequencies) whereby the system mutes lower priority channels in favor of critical information received on higher priority channels.

Another aspect of the device is the simultaneous reception and processing of multiple COMM channels with a single receiver. The system and method can recombine these multiple channels for relaying them to the aircrew via an appropriate interface, such as a pilot's headset, a loudspeaker, an instrument panel display or a smart device.

Another aspect of the device involves monitoring multiple channels and communicating with a voice-to-text conversion system so that important information is displayed to the pilot. Another aspect of the device involves monitoring important channels such as the weather. It does this by listening for trigger words. When such trigger words are detected, the system will transcribe the information into a general weather report. Other important channels that can be monitored are emergency channels.

BRIEF DESCRIPTION OF THE DRAWINGS

The drawings constitute a part of this specification and include exemplary embodiments of the present invention illustrating various objects and features thereof.

DETAILED DESCRIPTION OF THE PREFERRED EMBODIMENTS

I. Introduction and Environment

As required, detailed aspects of the present invention are disclosed herein, however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

II. RF Communications System 2

Figure 1:
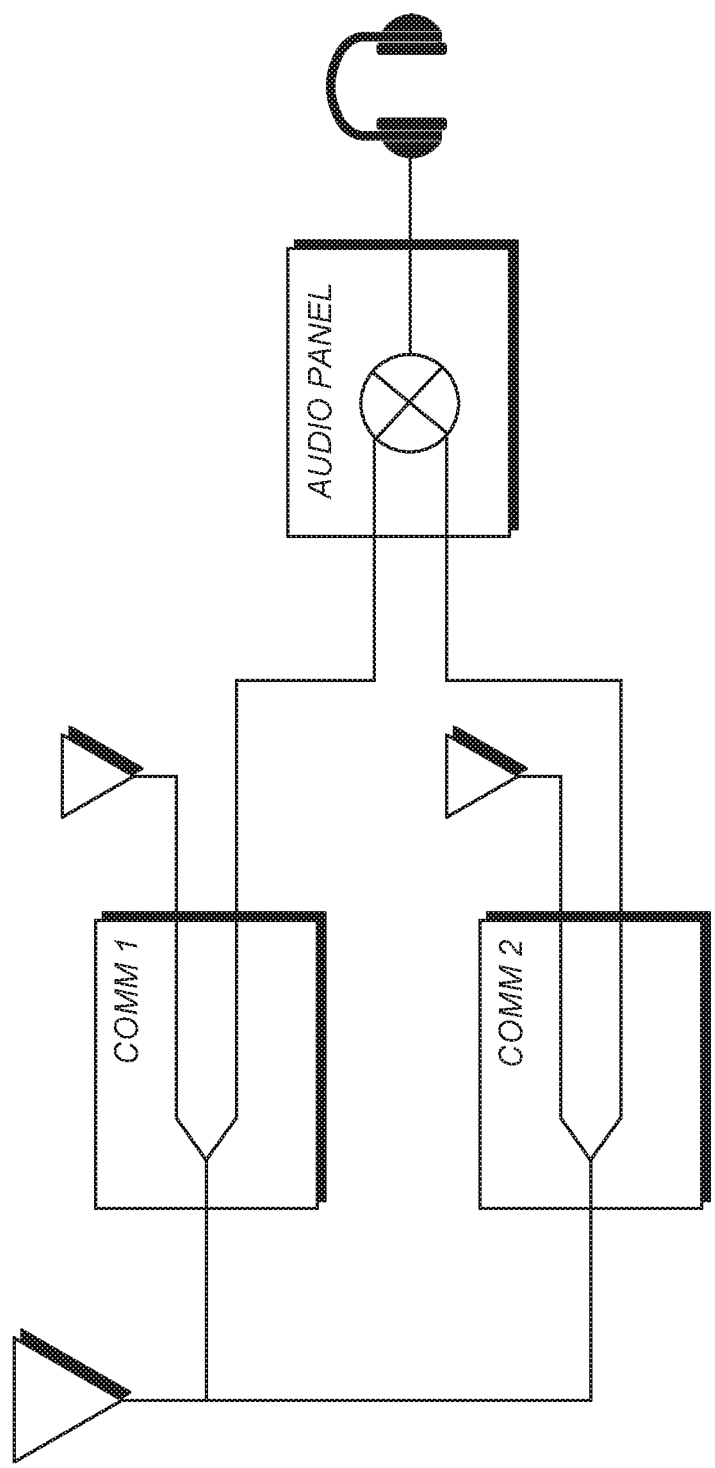
FIG. 1 is a schematic diagram of a prior art RF communications system for an aircraft with separate NAV/COMM and COMM transceivers.
Figure 2:
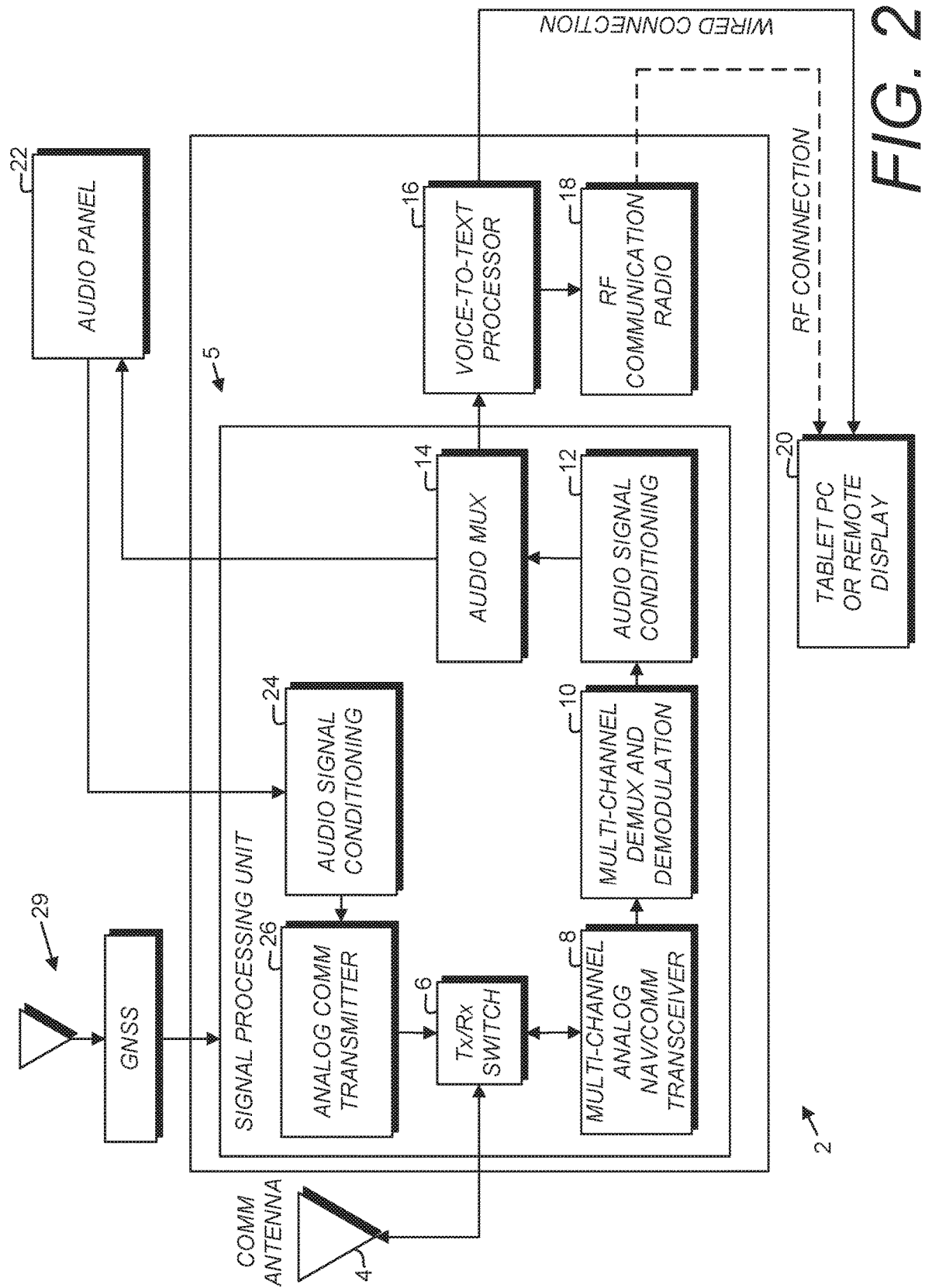
FIG. 2 is a schematic diagram of an RF communication system embodying an aspect of the present invention.

FIG. 2 shows an RF communication system 2 embodying an aspect of the invention. Without limitation on the generality of useful applications of the present invention, the system 2 is shown configured for an avionics application aboard an aircraft. A transmit/receive antenna 4 connects to a TX/RX switch 6, which in turn connects to a multi-channel (frequency) NAV/COMM analog communications receiver 8, which is configured for receiving both navigation and communications signals on multiple aviation channels or frequencies, and connects to a multi-channel demux and demodulation component 10. An audio signal conditioning component 12 further conditions the signal for an audio multiplexer (MUX) 14.

From the audio MUX 14 signals proceed to a user interface, such as a voice-to-text processor 16, which connects to an RF communication (COMM) radio 18, which transmits to a device 20, such as a tablet personal computer (PC) or remote display. Alternatively, voice-to-text processor 16 output can transfer directly to the display device 20 via a hard-wired connection. The audio MUX 14 output can also connect to an audio panel 22, e.g., on the aircraft control panel for output via a loudspeaker, headphones, etc. The audio panel 22 can also be configured for audio transmissions via an audio signal conditioning component 24, which connects to an analog communications (COMM) transmitter 26 for broadcast output through the TX/RX switch 6 and to the COMM antenna 4. A global navigation satellite system (GNSS) subsystem 29 is connected to the signal processing unit 5 for navigation.

Figure 3:
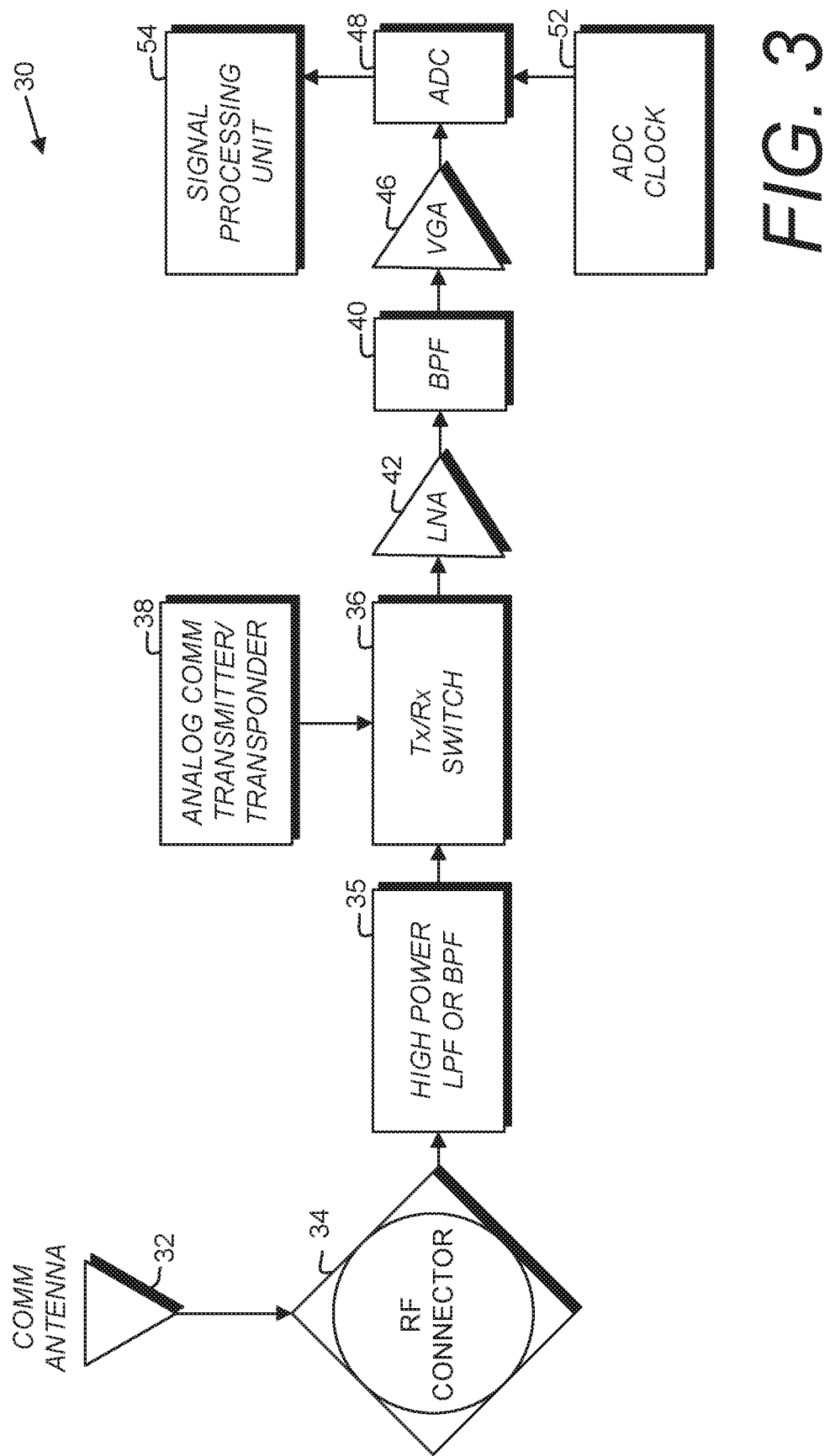
FIG. 3 is a schematic diagram of the architecture of a COMM transceiver.

FIG. 3 shows a physical implementation of the preferred embodiment of the invention as an example of the architecture of a COMM receiver 30 configured for the RF communications system 2. The preferred design includes a relatively high frequency and wide bandwidth analog-to-digital converter (ADC). Signals on multiple COMM channels (frequencies) enter the receiver 30 through a COMM antenna 32 coupled with an RF connector 34 and either a low pass filter (LPF) or a bandpass filter (BPF) 35. The filter(s) 35 improve the signal quality by rejecting or blocking unnecessary information and providing a relatively clean signal to the TX/RX switch 36, which is configured for switching between transmit (e.g., via a transmitter or transponder 38) and receiver modes of operation. In a receiver mode of operation signals from the switch 36 are input to a low noise amplifier (LNA) 42, which connects to a bandpass filter (BPF) 40 and then to variable gain amplifier (VGA) 46. Output from the VGA 46 is received by an analog-to-digital converter (ADC) 48, which is connected to an ADC clock 52 and provides output to a signal processing unit 54. The output signals can be routed to the antenna 32 for transmission. Filtering and routing the signals serves to protect a sensitive receiver from a high-power transmitter.

Figure 4:
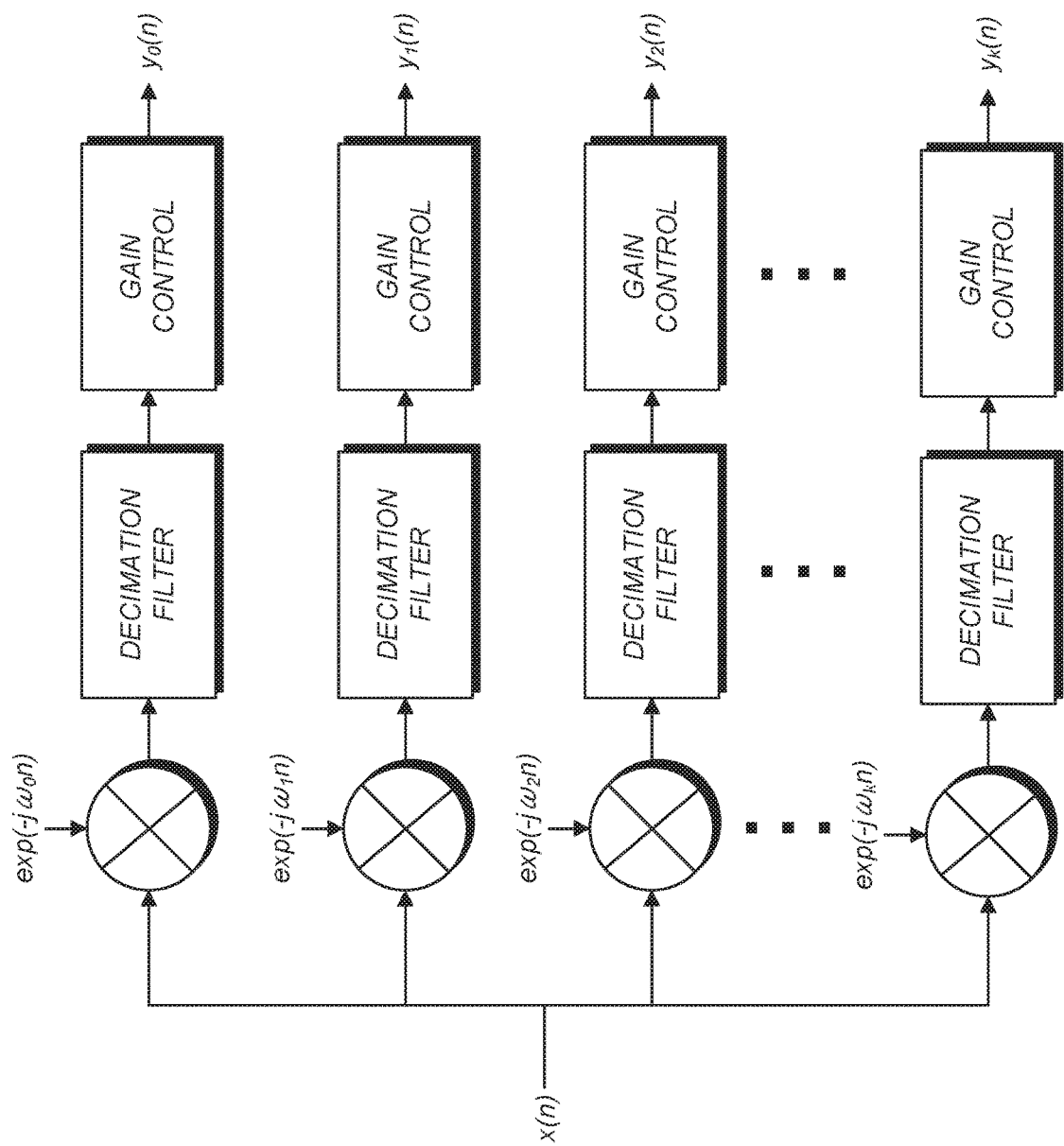
FIG. 4 is a schematic diagram of a signal processing unit of the RF communication system.

FIG. 4 shows a signal processing unit of the system 2, which functions to prioritize incoming signals on multiple channels (frequencies). Individual channels can be isolated within the sampled spectrum by applying the algorithm shown in FIG. 4. The signal processing unit includes a filter for each channel whereby received signal information can be processed concurrently. Users, e.g., pilots, can thereby monitor multiple selected channels conveniently. This is accomplished by automatically calculating exp(jwkn) and h(n) and adjusting the signal processing unit parameters based on user-selected channels (frequencies). An alternative embodiment enables users to rank the received signals based on their channels whereby the system mutes lower priority channels when signals conveying necessary information are received on higher priority channels. For example, if the system 2 mutes a channel: y0(n) will take precedence over y1(n); y1(n) will take precedence over y2(n); etc. the audio present on a low ranking channel, e.g., y1(n), can be routed to the headset. However, if an audio signal becomes present on channel y0(n), y1(n) will be muted to make the message on y0(n) clear and distinguishable. Alternative aspects of the invention include implementing the signal processing unit with a field-programmable gate array (FPGA), application specific integrated circuits (ASIC), digital signal processing (DSP), "Magic Fairy Dust" processors, and other technologies known to those skilled in the signal processing art.

The above implementation can utilize the entire 18.992 MHz spectrum with a single receiver and takes advantage of current Digital Signal Processing (DSP) technology. For example, multirate filter banks can be used to demultiplex (demux) the roughly 19 MHz spectrum into 760 (or 2280) individual channels. In theory, all 2280 channels could be monitored for valid signals and a report could be provided to the pilot which channels have information on them. However, the more likely use case is the pilot is only interested in a specific subset of channels based on the pilot's location on the earth. The signal processing unit will at this point have filters set up for each channel and process each concurrently. This will allow the pilot to listen to all of the selected channels at the same time, if desired. Another embodiment of the invention would monitor, download and save signals received on each channel. Such saved signal content (either analog or digital) could be further processed and mined for useful content.

Another embodiment of this aspect is to use the current position of the aircraft and tune the system 2 to a frequency within range of the current aircraft position. For example, if the aircraft is in proximity to Fargo, N. Dak., it could tune to 124.5 MHz (ATIS), 120.4 MHz (Approach), 133.8 MHz (Tower), and 122.8 MHz, 122.9 MHz, or 123.0 MHz for local CTAF airport channels. The system 2 could be put in automatic mode, where it would automatically tune based on the current position of the aircraft.

Another embodiment of the device is its ability to multiplex (mux) and demuxing audio channels. The purpose of this feature is to recombine the multiple channels and send them to the audio output. This allows the pilot to hear all of the audio at once, or single out select audio signals as primary and secondary. Another embodiment of this feature is the demux or mux select portions of the audio, which can use the Wireless Communication System and Method, as described in U.S. patent application Ser. No. 16/514,963, which is assigned to a common assignee and incorporated herein by reference. The onboard voice-to-text system and the muxed audio channels can be transcribed separately, yet allow a user to view multiple transactions at once on a mobile device or other user interface.

III. Modified or Alternative Embodiment RF Communications System 102

Figure 5:
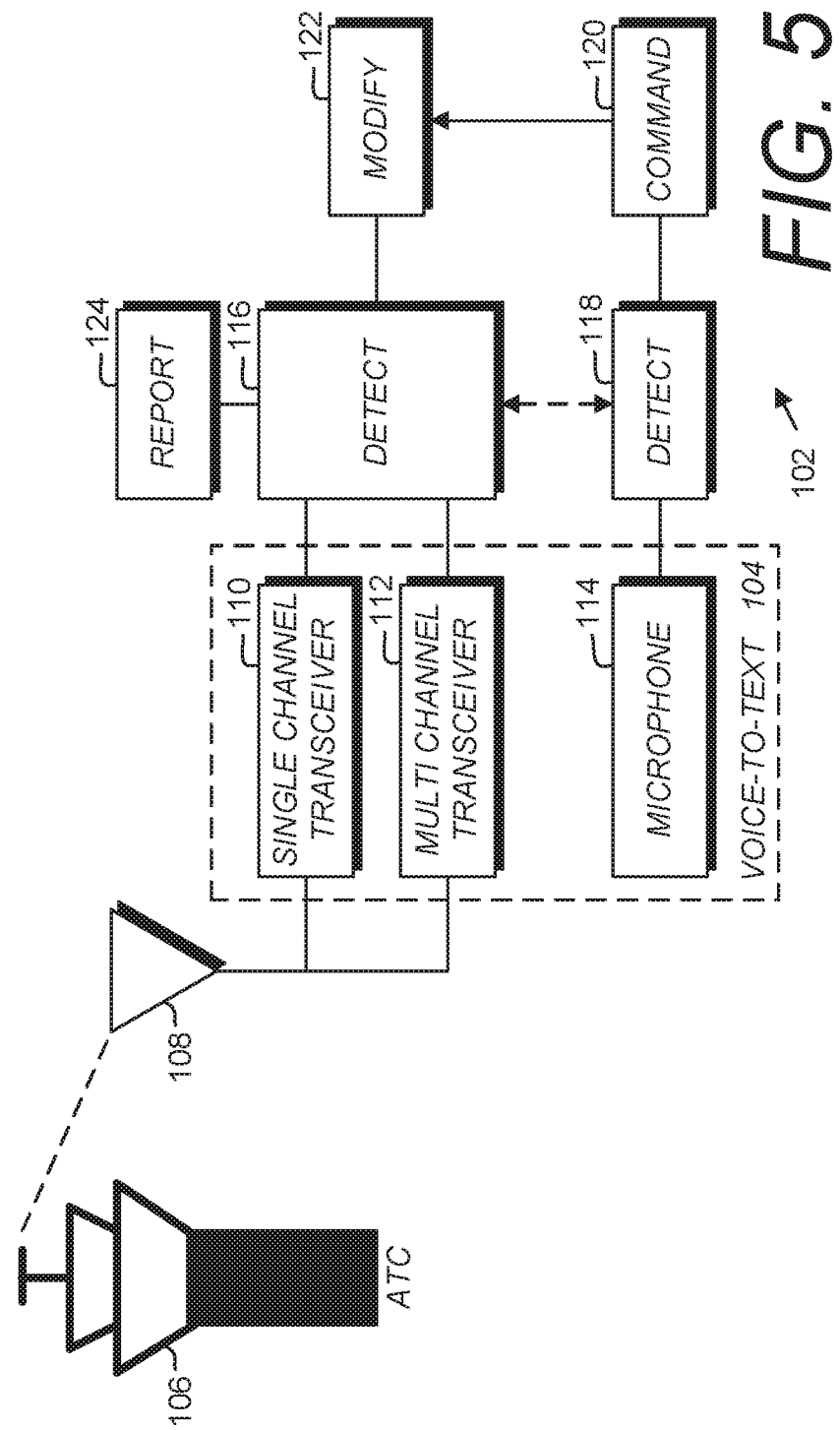
FIG. 5 is a block diagram of a modified or alternative embodiment of the present invention utilizing voice-to-text signal conversion processing.

FIG. 5 shows an RF Communications System 102 comprising a modified or alternative embodiment of the present invention. The system 102 can include a voice-to-text subsystem 104, for example, as disclosed in co-pending U.S. patent application Ser. No. 16/514,963, which is assigned to a common assignee and incorporated herein by reference. The voice-to-text subsystem 104 in an aircraft communicates via an aircraft antenna 108 with an Air Traffic Control (ATC) 106 to detect information and report it to the user, e.g., aircrew. The ATC can comprise a ground-based facility, e.g., at an airport, or another aircraft in an airborne application. The system 102 can be interactive and transmit from the aircraft to the ATC 106.

As shown in FIG. 5, the voice-to-text subsystem 104 can utilize a single-channel transceiver 110 (e.g., tuned to a single frequency) and a multi-channel transceiver 112, which detects, prioritizes and selects signals received on multiple frequencies. A microphone 114 can be used by the aircrew for analog voice input. A detection component 116 detects incoming signals on the transceivers 110, 112. A detection component 118 detects voice input on the microphone 114. A command component 120 receives detected commands, which can be modified (e.g., filtered, recognized, transcribed, etc.) at a modify component 122 for communication with the detection 116 and reporting at 124, e.g., to an audio interface, screen display, smart device or other user interface.

In operation, as information is received on the aircraft audio channels it can either "detect" or "modify" the incoming communication. The system 2 or 102 will listen for concerning words, and if a word is detected, the pilot can either manually prioritize the channel to become the primary channel, or the system will indicate to the pilot through the mobile device that concerning information was found. Next the device will take the concerning information, transcribe it, and display it on the pilot's mobile device.

Another application of the device is one in which the multi-channel system and voice-to-text system process and mine each audio channel for other useful information. The pilot can pre-select words, which if detected, the system can listening for and transcribe. Without limitation, such concerning words could include: Alert; Advisory; Alarm; Airport; Traffic; Avoid; Terrain; Warning; Change; Weather; Icing; Runway; Closure; Lightning; Wind Gusts; etc. By having a set of concerning words and phrases, the device can be monitoring to other channels in the background, which the pilot may not otherwise listen to. An example of this is when pilots have to flip back and forth to the weather channel, to check weather conditions as they get closer to the airport, or when runways are out of order or the airport is otherwise inoperative. The system allows for the pilot to create a pre-set list of words, or concerning words, which the multi-channel and voice-to-text system can monitor on background audio channels to inform the pilot if any concerning information occurred. These concerning words can be any type of word related to weather commands or instructions. For example, the device can listen to the weather channel in the background even through the pilot is not monitoring it on a primary channel. When the device hears the weather channel say terms like "lightning" or "wind gusts," it can select the concerning information and then transcribe the dialogue into a readable format, such as a weather report. The weather report can then be displayed onto a pilot's mobile device.

Another embodiment of this feature has the system transcribing ATIS for the aircrew, who are often tasked with monitoring ATIS advisories, while still talking with ATC. This feature allows for safety and security in pilot communication.

Another embodiment of the system uses the concerning words that are focused on emergency channels. For example, commercial airliners can pre-program the device for monitoring words which are commonly used for guard channels. This is important because commercial aircrew are often tasked with monitoring these channels. The present invention addresses this problem by creating a system where aircrew are automatically notified of any concerning language on these guard channels.

An alternate embodiment of the device can use aircraft call sign and tail number detection. This embodiment utilizes the multi-channel system to extract communications specific to a particular aircraft. For example, aircraft that are not Automatic Dependent Surveillance-Broadcast (ADS-B) equipped can cause issues for nearby aircrew because they are not easily identifiable. If ATC asks the pilot to identify themselves, the device will detect the word "ident" or "identify". When the device detects these terms, on any channel, and the aircraft is identified, this information can be transmitted to receivers on other aircraft. Aircrew can receive this information via the aircraft's interface devices, via mobile devices, etc. If an aircraft misses an initial approach, the system can output missed approach instructions such as "you are cleared for landing and your missed approach instructions are fly heading 280 at 2000." For example, if an aircraft misses the approach, it can fly back out and have the directions visualized on a video monitor screen in the cockpit. Another embodiment utilizes aircraft tail numbers for detection on any channel, which causes pinging the system and activating a display on the dashboard panel or a mobile device.

Another application of this feature is to detect the position and direction-of-travel of an aircraft. Using ADS-B and voice communication the aircraft and its flight plan can be identified and a marker can be placed on a map for use by ATC and other aircraft.

It is to be understood that the invention can be embodied in various forms and is not to be limited to the examples specifically discussed above. The range of components and configurations which can be utilized in the practice of the present invention is virtually unlimited.

Having this described the invention, what is claimed as new and desired to be secured by Letters Patent is:

1. A radio frequency (RF) communications system, which comprises:
    a communications (COMM) antenna;
    a signal processing unit configured for receiving comm signals from said COMM antenna, said comm signals constituting communications;
    a transmitter/receiver (tx/rx) switch configured for switching said signal processing unit between transmit and receive modes;
    a multi-channel transceiver configured for receiving and transmitting the comm signals on multiple channels, one of the multiple channels being a primary channel and one of the multiple channels being a secondary channel;
    a voice-to-text (VTT) processor connected to said signal processing unit and configured for detecting concerning words in the communications from said secondary channel and transcribing said communications from said secondary channel; and
    an output device connected to said VTT processor and configured for indicating that concerning information was found on the secondary channel and displaying textual output corresponding to said communications from said secondary channel.

2. The RF communications system according to claim 1, said multi-channel transceiver being an analog NAV/COMM transceiver.

3. The RF communications system according to claim 1, further comprising a smart device configured for receiving said communications and displaying the textual output.

4. The RF communications system according to claim 3, said smart device including said VTT program.

5. The RF communications system according to claim 1,
    said primary channel being an air traffic channel for communicating with air traffic control (ATC) and other aircraft; and
    said secondary channel being a weather channel.

6. The RF communications system of claim 5, wherein the VTT processor is further configured to transcribe the concerning information into a weather report.

7. The RF communications system of claim 1, wherein the signal processing unit is further configured to switch the secondary channel to a primary channel when the VTT processor detects concerning words in the communications from the secondary channel.

8. The RF communications system of claim 1, wherein the concerning words are pilot pre-selected words and phrases.

9. The RF communications system of claim 1, wherein the concerning words are at least one of aircraft call signs and aircraft tail numbers.

10. The RF communications system of claim 1, wherein the output device is further configured to display a visualization graphic corresponding to transcribed instrument approach instructions.

11. An RF communications method, which comprises the steps of:
    receiving comm signals from a COMM antenna via a signal processing unit on multiple channels via a multi-channel transceiver, said comm signals constituting communications, one of the multiple channels being a primary channel and one of the multiple channels being a secondary channel;
    switching said signal processing unit between transmit and receive modes via a transmitter/receiver (tx/rx) switch;
    detecting concerning words in the communications from the secondary channel via a VTT processor connected to said signal processing unit;
    transcribing said communications from said secondary channel via the VTT processor;
    indicating via an output device connected to said VTT processor that concerning information was found on the secondary channel; and
    displaying a textual output corresponding to said communications from said secondary channel via the output device.

12. The RF communications method according to claim 11,
    said multi-channel transceiver being an analog NAV/COMM transceiver.

13. The RF communications method according to claim 11, said output device being a smart device.

14. The RF communications method according to claim 13,
    said smart device including the VTT program.

15. The RF communications method according to claim 11, said primary channel being an air traffic channel for communicating with ATC and other aircraft, and said secondary channel being a weather channel.

16. The RF communications method of claim 15, further comprising a step of transcribing the concerning information into a weather report.

17. The RF communications method of claim 11, further comprising a step of switching the secondary channel to a primary channel when the VTT processor detects concerning words in the communications from the secondary channel.

18. The RF communications method of claim 11, further comprising a step of receiving pilot-selected words and setting the pilot-selected words as concerning words.

19. The RF communications method of claim 11, further comprising a step of displaying a visualization graphic corresponding to transcribed instrument approach instructions via the output device.

* * * * *